United States Patent [19]
Arikawa

[11] Patent Number: 5,040,854
[45] Date of Patent: Aug. 20, 1991

[54] BRAKE FLUID PRESSURE CONTROL APPARATUS FOR A VEHICLE

[75] Inventor: Tetsuro Arikawa, Kanagawa, Japan

[73] Assignee: Nippon ABS, Ltd., Tokyo, Japan

[21] Appl. No.: 460,670

[22] Filed: Nov. 28, 1989

[30] Foreign Application Priority Data

Nov. 28, 1988 [JP] Japan .............................. 63-300171

[51] Int. Cl.⁵ .............................................. B60T 8/34
[52] U.S. Cl. ...................................... 303/119; 303/93
[58] Field of Search ............... 303/113, 119, 115, 110, 303/100, 93

[56] References Cited

U.S. PATENT DOCUMENTS

| | | | |
|---|---|---|---|
| 4,418,966 | 12/1983 | Hattwig .............................. | 303/119 |
| 4,509,802 | 4/1985 | Solleder et al. ..................... | 303/110 |
| 4,730,878 | 3/1988 | Reinartz et al. ................. | 303/119 X |
| 4,744,616 | 5/1988 | Arikawa ................................ | 303/92 |
| 4,818,039 | 4/1989 | Bertling et al. ...................... | 303/113 |
| 4,902,075 | 2/1990 | Uno et al. ............................. | 303/113 |

FOREIGN PATENT DOCUMENTS 2139230 2/1973 Fed. Rep. of Germany .
63221530 3/1990 Japan .
2211569 7/1989 United Kingdom .

*Primary Examiner*—Matthew C. Graham
*Attorney, Agent, or Firm*—Jones, Day, Reavis & Pogue

[57] ABSTRACT

In a brake fluid pressure control apparatus for vehicle which controls braking slip and driving slip of wheels, first and second brake conduits are arranged for connecting a master cylinder with a wheel cylinder, respectively. A fluid pressure control valve is arranged in the first brake conduit for controlling the brake fluid pressure of the wheel. Between a main conduit for connecting the master cylinder with the fluid pressure control valve, and the second brake conduiut, a valve apparatus is arranged for connecting the master cylinder with the fluid pressure control valve and cutting off the master cylinder from the second brake conduit normally and during the braking slip control operation, and for cutting off the master cylinder from the fluid pressure control valve and connecting the master cylinder with the second brake conduit during the driving slip control. A check valve is arranged so as to permit brake fluid to flow from the master cylinder side towards the wheel cylinder side.

5 Claims, 4 Drawing Sheets

BRAKE FLUID PRESSURE CONTROL APPARATUS FOR A VEHICLE

BACKGROUND OF THE INVENTION

1. Field of the Invention

This invention relates to a brake fluid pressure control apparatus for a vehicle which controls braking slip and driving slip of wheels.

2. Description of the Prior Arts:

For example, the West German Patent Opening Gazette No.2139230 and the Japanese Patent Application No. 221530/1988 disclose the brake fluid pressure control apparatus for a vehicle in which a fluid pressure control valve is arranged in a conduit connecting a master cylinder with a wheel cylinder for controlling the brake fluid pressure of the wheel, and further a cut-off valve is arranged between the fluid pressure control valve and the master cylinder. The cut-off valve is open during the normal operation and during the anti-skid control operation. It is closed during the drive slip control operation in which the brake pressure is so increased, decreased and maintained at constant by the control of the fluid pressure control valve that the driven wheel rotates at the optimum slip.

However, when the driver treads the brake pedal during the drive slip control operation, the brake pressure is transmitted to the wheel cylinder in some time lag. The brake light switch requires some time to detect the tread of the brake pedal. The control unit requires some time to judge that the drive slip control has become necessary no longer. The fluid pressrue control valve requires some time to change over to the initial position, in which the master cylinder and the wheel cylinder communicate with each other, from the other position to decrease the brake pressure or maintain it, if the fluid pressure control valve is changed over to the other position during the drive slip control operation. The above required times are totalled to the above time lag. Thus, it is difficult to rapidly brake the vehicle of the driver's free will during the drive slip control operation.

SUMMARY OF THE INVENTION

Accordingly, it is an object of this invention to provide a brake fluid pressure control apparatus for a vehicle which controls braking slip and driving slip of wheels, and can rapidly brake the vehicle of the driver's free will even during the drive slip control.

In accordance with an aspect of this invention, a brake fluid pressure control apparatus for vehicle comprising: (A) master cylinder means; (B) wheel cylinder means; (C) a control unit for measuring braking slip and driving slip of wheels; (D) first brake fluid conduit means for connecting said master cylinder means with said wheel cylinder means; (E) fluid pressure control valve means being arranged in said first brake fluid conduit means and receiving instructions from said control unit for controlling brake fluid pressures to said wheel cylinder means; (F) hydraulic reservoir means for reserving the brake fluid discharged through said fluid pressure control valve means from said wheel cylinder means; (G) fluid pressure pump means for pressurizing the brake fluid in said hydraulic reservoir means and supplying it to main conduit means connecting said master cylinder means with said fluid pressure control valve means; (H) second brake fluid conduit means for connecting said master cylinder means with said wheel cylinder means; (I) a valve apparatus being arranged in said main conduit means, said valve apparatus having a first position for making said master cylinder means to communicate with said fluid pressure control valve means and cutting off said master cylinder means from said second brake fluid conduit means, and a second position for making said master cylinder means to communicate with said second brake fluid conduit means, and cutting off said master cylinder means from said fluid pressure control valve means, an said valve apparatus taking said first position normally and during the braking slip control operation and taking said second position during the driving slip control operation; and (J) check valve means being arranged in said second brake fluid conduit means, said check valve means permitting brake fluid to flow from said master cylinder means side towards said wheel cylinder means side.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 1:
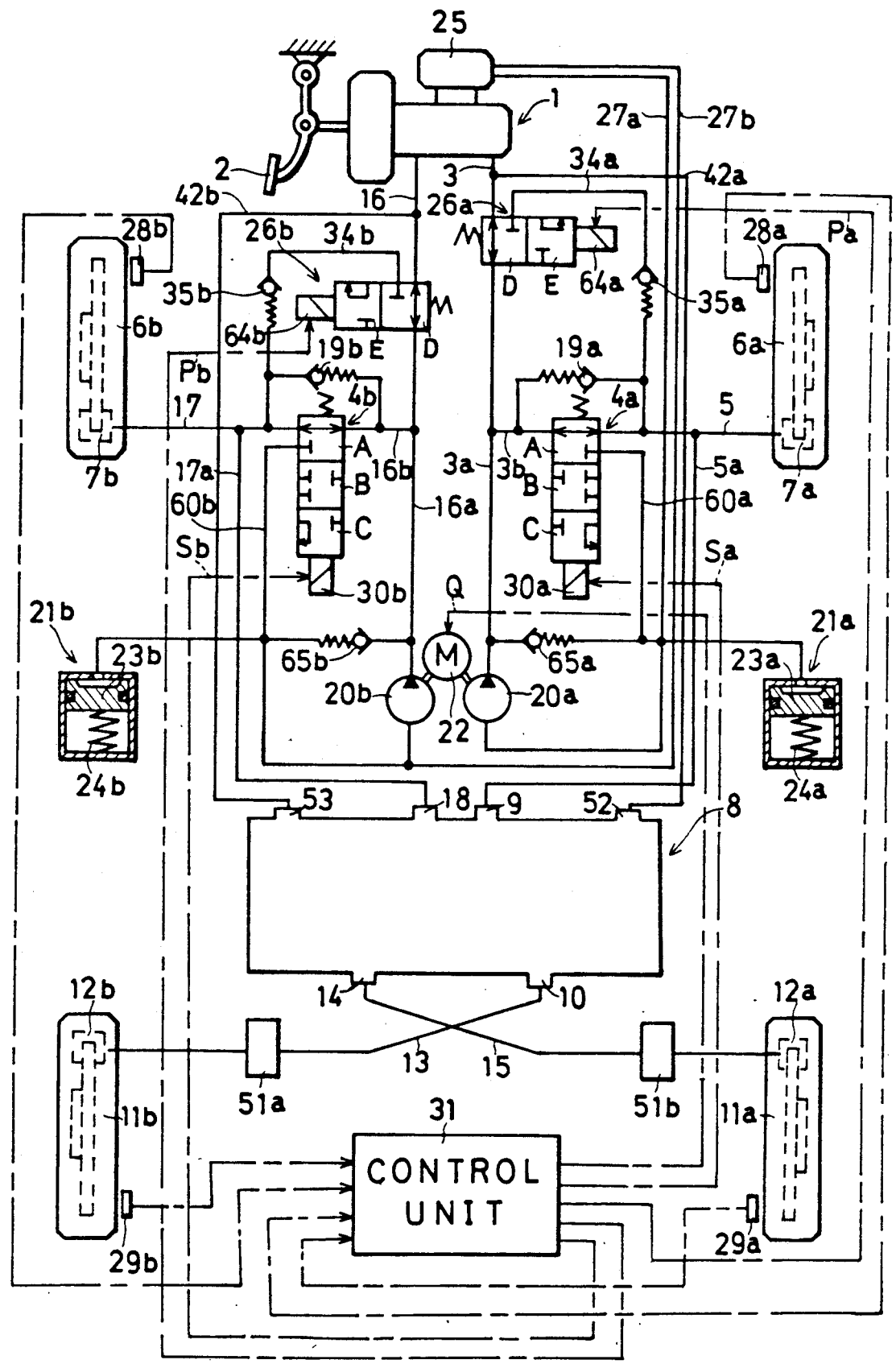
FIG. 1 is a schematic view of a brake fluid pressure control apparatus according to one embodiment of this invention.

In FIG. 1, a brake pedal 2 is connected to a tandem master cylinder 1 which is provided with a hydraulic reservoir 25 which always reserves brake fluid. One fluid pressure chamber of the tandem master cylinder 1 is connected to a wheel cylinder 7a of a right front wheel 6a through a conduit 3, a three-port two-position electro-magnetic change-over valve 26a, a three-port three-position electro-magnetic change-over valve 4a and a conduit 5. A conduit 5a diverging from the conduit 5 is further connected to a first input port 9 of a pressure selecting apparatus 8 to be described hereinafter. A first output port 10 thereof is connected to a wheel cylinder 12b of a left rear wheel 11b through a conduit 13 and a proportioning valve 51a.

Another fluid pressure chamber of the tandem master cylinder 1 is connected to a wheel cylinder 7b of a left front wheel 6b through a conduit 16, a three-port two-position electro-magnetic change-over valve 26b, a three-port three-position electro-magnetic change-over valve 4b and a conduit 17. A conduit 17a diverging from the conduit 17 is further connected to a second input port 18 of the pressure selecting apparatus 8. A second output port 14 of the pressure selecting apparatus 8 is connected to a wheel cylinder 12a of a right rear wheel 11a through a conduit 15 and a proportioning valve 51b.

Discharge openings of the change-over valves 4a and 4b are connected through conduits 60a and 60b to hydraulic reservoirs 21a and 21b. The hydraulic reservoirs 21a and 21b consist of casings, pistons 23a, 23b which are slidably fitted to the casings, respectively, and weak springs 24a, connected to suction openings of fluid pressure pumps 20a and 20b.

Although the fluid pressure pumps 20a and 20b are schematically shown, they consist of a pair of casings, pistons slidably fitted to the casings, an electro-motor 22 reciprocating the pistons, and check valves. Supply openings of the fluid pressure pumps 20a and 20b are connected to the conduits 3 and 16 through conduits 3a and 16a. Further, the suction openings of the fluid pressure pumps 20a and 20b are connected to the hydraulic reservoir 25 of the tandem master cylinder 1 through conduits 27a and 27b.

Wheel speed sensors 28a, 28b, 29a and 29b are associated with the wheels 6a, 6b, 11a and 11b respectively and they generate pulse signals having frequencies proportional to the rotational speeds of the wheels 6a, 6b, 11a and 11b. The pulse signals of the wheel speed sensors 28a, 28b, 29a and 29b are supplied as input to a control unit 31.

The control unit 31 has well known function to calculate or measure the wheel speed the approximate vehicle speed, the slip ratio and the deceleration on the basis of the pulse signals from the sensors 28a, 28b, 29a and 29b. Control signals Sa and Sb, and a motor drive signal Q as the caluculation or measurement result are generated from the control unit 31, and are supplied to solenoid portions 30a and 30b of the change-over valves 4a and 4b and electro-motor 22, respectively.

Dash lines represent electric lead wires.

Although schematically shown, the change-over valves 4a, and 4b have well-known constructions.

The change-over valves 4a and 4b take any one of three positions A, B and C in accordance with the current intensities of the control signals Sa and Sb supplied to the solenoid portions 30a and 30b thereof.

When the control signals Sa and Sb are "0" in current level or no voltage is applied the change-over valves 4a and 4b take the first positions A for increasing the brake pressure to the brake for the wheels, respectively. In the first position A, the tandem master cylinder 1 side and the wheel cylinder 7a, 7b side are made to communicate with each other. When the control signals Sa and Sb are "½" in current level, therefore when the brake holding signal is generated, the change-over valves 4a and 4b take the second positions B for maintaining the brake pressure to the brake at constant, respectively. In the second position B, the communications between the tandem master cylinder 1 side and the wheel cylinder 7a, 7b side, and between the wheel cylinder side and the side of the hydraulic reservoirs 21a, 21b are interrupted. When the control signals Sa and Sb are "1" in current level, therefore when the brake relieving signal is generated, the change-over valves 4a and 4b take the third positions C for decreasing the brake pressure to the brake, respectively. In the third position C, the communication between the tandem master cylinder 1 side and the wheel cylinder 7a, 7b side is interrupted, while the communication between the wheel cylinder 7a, 7b side and the hydraulic reservoir 21a, 21b side is made. The brake fluid is discharged through the conduits 60a, 60b, 27a and 27b into the hydraulic reservoirs 21a, 21b and the hydraulic reservoir 25 of the tandem master cylinder 1 from the wheel cylinders 7a, 7b.

When anyone of the control signals Sa and Sb becomes initially "1", the drive signal Q is generated, and it is kept during the skid control operation. The drive signal Q is supplied to the electro-motor 22 to drive the fluid pressure pumps 20a and 20b. The control unit 31 further generates valve drive signals Pa and Pb for the change-over valves 26a and 26b. During the lock-preventing control or the drive slip-preventing control operation, the electro-motor 22 continues to be driven.

Next, the details of the pressure selecting apparatus 8 will be described with reference to FIG. 2.

Figure 2:
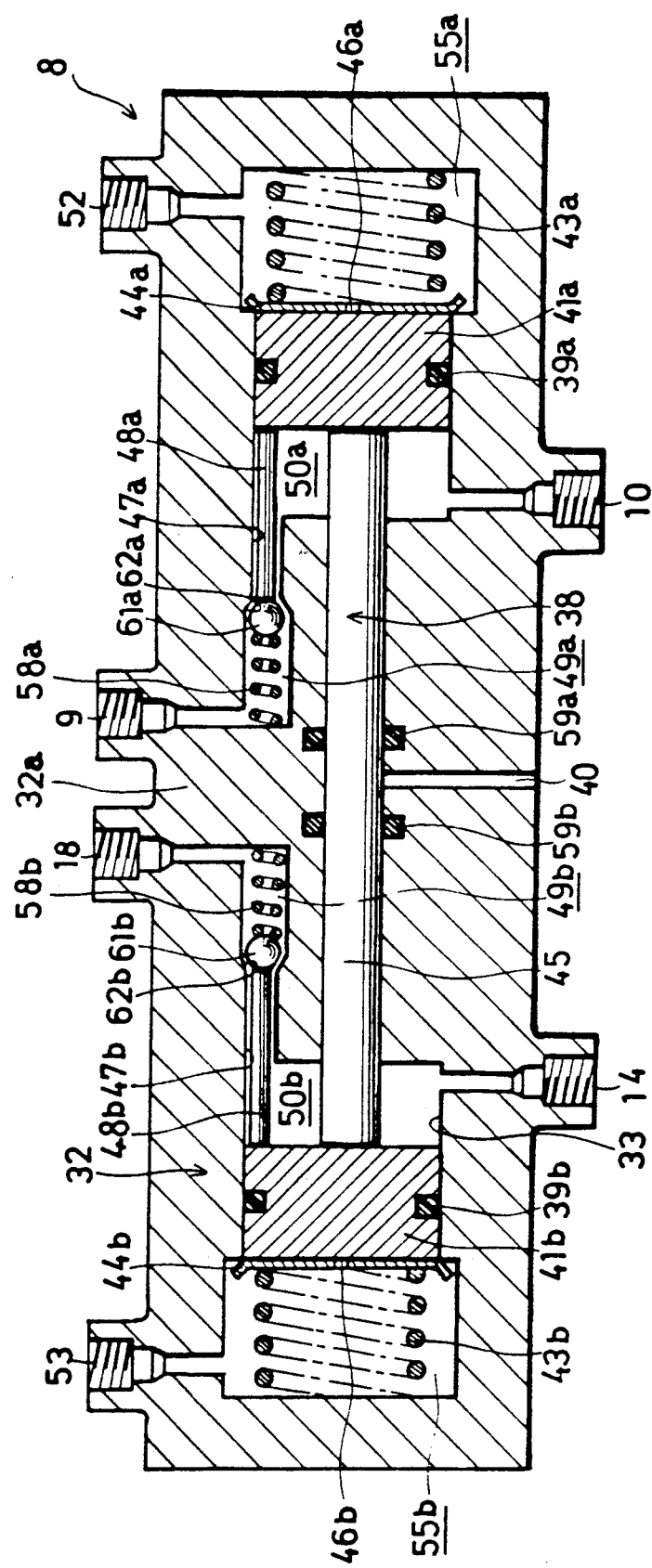
FIG. 2 is an enlarged cross-sectional view of pressure selecting apparatus in FIG. 1.

In FIG. 2, a stepped axial through hole 33 is made in a casing 32 of the pressure selecting apparatus 8. The above described first input port 9 and second input port 18 are formed in the upper central part in the figure. A symmetric piston group 38 consisting of three members is slidably fitted to the stepped axial through hole 33. The three members are a pair of larger-diameter pistons 41a and 41b and a smaller-diameter piston 45. The larger-diameter pistons 41a and 41b are provided with seal rings 39a and 39b. Output chambers 50a and 50b are formed at the insides of the larger-diameter pistons 41a and 41b. Master cylinder pressure chambers 55a and 55b are formed at the outsides of the larger-diameter pistons 41a and 41b. Spring receivers 44a and 44b contact with the master cylinder pressure chamber side of the larger-diameter pistons 41a and 41b. Holes 46a and 46b are formed in the center of the spring receivers 44a and 44b. The smaller-diameter piston 45 is slidably fitted to a central hole of a partition portion 32a of the casing 32, sealed with seal rings 59a and 59b. A space between the seal rings 59a and 59b communicates through a vent 40 with the atmosphere. The larger-diameter pistons 41a and 41b are urged inwards by springs 43a and 43b which are substantially equal to each other in spring force. Thus, the piston group 38 is normally located at a shown neutral position.

The master cylinder pressure chambers 55a and 55b and the output chambers 50a and 50b communicate with the master cylinder 1 and conduits 13 and 15 through connecting ports 52 and 53 and conduits 42a and 42b, and through the connecting ports 10 and 14, respectively.

Valve rods 48a and 48b are slidably fitted to axial holes 47a and 47b made in the partition portion 32a of the casing 32. Outer ends of the valve rods 48a and 48b contact with the inner surfaces of the larger-diameter pistons 41a and 41b. Inner ends thereof contact with valve balls 61a and 61b urged by springs 58a and 58b. When the piston group 38 is located at the shown neutral position, the valve balls 61a and 61b are separated from valve seats 62a and 62b, as shown in FIG. 2. Valve chambers 49a and 49b in which the springs 58a and 58b are compressed, communicate with the conduits 5a and 17a through the input ports 9 and 18, respectively.

In FIG. 1, check valves 19a and 19b are connected in parallel with the change-over valves 4a and 4b, or between conduits 3b, 16b and 5, 17, respectively. They permit brake fluid to flow only in the direction from the wheel cylinder side towards the tandem master cylinder side. Both sides of the change-over valves 4a and 4b communicate with each other through throttling holes in the A-positions. Accordingly, pressurized fluid is rapidly returned through the check valves 19a and 19b to the tandem master cylinder 1 from the wheel cylinders 7a, 7b, 12a and 12b, when the brake is relieved.

Or when the brake pedal 2 is released from treading in the B or C-positions of the change-over valves 4a and 4b during the anti-skid control, the brake fluid can be returned from the wheel cylinder side to the master cylinder side through the check valves 19a and 19b.

The first and second output ports 10, 14 of the pressure selecting apparatus 8 are connected to the wheel cylinders 12a, 12b of the rear wheels 11a, 11b through the proportioning valves 51a, 51b. The proportioning valves 51a, 51b have well-known constructions. When the pressurized fluid pressure of the input port side becomes larger than a predetermined value, the proportioning valves 51a, 51b transmit to the output side the pressurized fluid decreased proportionally at a predetermined ratio.

In this embodiment, the proportioning valves 51a and 51b are constructed separately for the rear wheels 11a and 11b. Instead, they may be unitedly constructed as one body.

When the drive signals Pa and Pb are supplied to the solenoid portions 64a and 64b of the change-over valves 26a and 26b, the latters take the positions E in which the communication between the tandem master cylinder side and the change-over valves 4a, 4b side is interrupted, but the tandem master cylinder 1 is made to communicate with conduits 34a and 34b as second brake fluid conduits. Further, pressurized fluid may be supplied from the tandem master cylinder 1 to the wheel cylinders 7a, 7b of the front wheels 6a, 6b through the conduits 34a, 34b and check valves 35a, 35b. The change-over valves 26a and 26b take normally or, when the solenoid portions 64a and 64b are not energized by the drive signals Pa and Pb, the positions D in which both side sare made to freely communicate with each other.

Check valves 65a and 65b as relief valves are connected between the discharging sides of the fluid pressure pumps 20a and 20b and the conduits 27a and 27b and they permit fluid to flow from the discharging sides of the fluid pressure pumps 20a and 20b towards the conduits 27a and 27b.

Next, there will be described operations of the above described embodiment of this invention.

It is now assumed that both of the conduit systems are in order, and the wheels 6a, 6b, 11a and 11b run on the road which is uniform in frictional coefficient.

The vehicle driver treads the brake pedal 2. At the beginning of the braking, the control signals Sa and Sb are "0" from the control unit 31. Accordingly, the change-over valves 4a and 4b are in the A-position. Pressurized fluid is supplied from the tandem master cylinder 1 to the wheel cylinders 7a and 7b of the front wheels 6a and 6b through the conduits 3, 16, the change-over valves 26a, 26b, the change-over valves 4a, 4b and the conduits 5, 17. Further, it is supplied to the wheel cylinders 12a and 12b of the rear wheels 11a and 11b through the first and second input ports 9, 18, valve chambers 49a, 49b, the output chambers 50a, 50b, the first and second output ports 10, 14 in the pressure selecting apparatus 8, the conduits 13 15 and the proportioning valves 51a and 51b. Thus, the wheels 6a, 6b, 11a and 11b are braked.

The fluid pressures of the fluid pressure generating chambers of the tandem master cylinder 1 rise substantially at the same rate. Accordingly, the pressures of the master cylinder pressure chambers 55a and 55b are substantially equal to each other in the pressure selecting apparatus 8. Further, the pressures of the output chambers 50a and 50b, and therefore the valve chambers 49a and 49b, when the valve balls 61a and 61b are separated from the valve seats 62a and 62b, are substantially equal to each other. Accordingly, the piston group 38 is not moved, and remains positioned at the shown neutral position. With the increase of the brake fluid pressure, when the deceleration of the wheels 6a, 6b, 11a and 11b becomes higher than the predetermined deceleration, the control signals Sa and Sb become middle level "½". The solenoid portions 30a, 30b are energized and the change-over valves 4a and 4b take the second positions B. The conduits 3, 16 are interrupted from the conduits 5, 17. Further, the conduits 5, 17 are interrupted from the conduits 60a, 60b. Thus the brake for the wheels 6a, 6b, 11a, and 11b are maintained constant.

When the slip ratio of the wheels 6a, 6b, 11a and 11b becomes higher than the predetermined slip ratio, the control signals Sa and Sb become high level "1". The solenoid portions 30a and 30b are energized. The change-over valves 4a and 4b take the third positions C. The conduits 3 and 16 are interrupted from the conduits 5 and 17, respectively. However, the conduits 5 and 17 are made to communicate with the conduits 60a and 60b. The pressurized fluid is discharged from the wheel cylinders 7a and 7b of the front wheels 6a and 6b into the hydraulic reservoirs 21a and 21b through the conduits 5, 60a and 17, 60b. The pressurized fluid from the wheel cylinders 12a and 12b of the rear wheels 11a and 11b is also discharged through the proportioning valves 51a, and 51b, the conduits 15, 13, the output ports 14, 10, the output chambers 50a, 50b, the valve chambers 49a, 49b, the input ports 18, 9 in the pressure selecting apparatus 8, and the conduits 17a, 5a, 60a, and 60b, into the hydraulic reservoirs 21a, 21b. Thus, the brakes for the wheels 6a, 6b, 11a and 11b are relieved.

The control signals Sa and Sb become "1", when the slip ratio of the wheel becomes higher than the predetermined value. Thus, the brake relieving signal is generated from the control unit 31.

It is supplied to an OFF delay timer (not shown)in the control unit 31. The output of the OFF delay timer is amplified to generate the driving signal Q. The fluid pressure pumps 20a and 20b are driven by the driving signal Q. After the initial brake relieving signal has been generated, the wheels are judged to be in the course of the anti-skid control. The output of the OFF delay timer continues to be generated.

The discharging brake fluid of the fluid pressure pumps 20a and 20b is returned into the tandem master cylinder 1 through the change-over valves 26a and 26b. Thus, the stroke of the brake pedal 2 is decreased. Hereinafter, the above operations or controls are repeated. When the vehicle is decelerated to the desirable speed or stops, the brake pedal 2 is released from treading. Accordingly, the brake fluid from the wheel cylinders 7a, 7b, 12a and 12b is returned through the conduits, the pressure selecting apparatus 8, the change-over valves 4a, 4b, the check valves 19a, 19b and the change-over valves 26a and 26b into the tandem master cylinder 1. Thus, the brake is relieved In the above description, the control signals Sa and Sb become "0", "1" or "½" at the same time. However, when the frictional coefficients of the road are considerably different at the right and left sides, the control signals Sa and Sb do not become "0", "1", or "½" at the same time. For example, when the frictional coefficient of the right side of the road on which the wheels 6a and 11a are running is relatively small, the control signal Sa first becomes "1"Next, such a case will be described.

The operations at the beginning of the braking are the same as above described. When the control signal Sa becomes "1", the change-over valve 4a takes the position C. Pressurized fluid is discharged into the hydraulic reservoir 21a from the wheel cylinders 7a and 12b. The pressurized fluid is discharged to the hydraulic reservoir 21b from the wheel cylinder 12b of the left rear wheel 11b through the proportioning valve 51a, the conduit 13, the first output port 10, the path between the valve ball 61a and the valve seat 62a, the first input port 9 and conduits 5a and 60a. Thus the brake to the wheels 6a and 11b is relieved.

In the pressure selecting apparatus 8, the fluid pressure is decreased in the output chamber 50a at the right side of the piston group 38. On the other hand, the fluid pressure in the other output chamber 50b continues to increase Accordingly, the leftward pushing force to the piston group 38 becomes larger. The piston group 38 is moved leftwards. Thus, the left valve ball 61b comes to seat the valve seat 62b by spring action of the spring 58b. On the other hand, the right valve ball 61a is further separated from the valve seat 62a by the valve rod 48a and the valve ball 61a maintains the opening state.

When the piston group 38 is further moved leftwards, the volume of the left output chamber 50b increases. In other words, the fluid pressure of the wheel cylinder 12a of the rear wheel 11a is lowered with increasing of the volume since the output chamber 50b is interrupted from the wheel cylinder 7b of the left front wheel 6b and it is always made to communicate with the wheel cylinder 12a of the right rear wheel 11a.

When the control signal Sa becomes again "0" to increase the fluid pressure of the output chamber 50a, the piston group 38 is moved rightwards to decrease the volume of the left output chamber 50b. while the left valve ball 61b seats the valve seat 62b. Thus, the brake fluid pressure of the wheel cylinder 12a of the rear wheel 11a is again increased. The above-described operation means that the brake fluid pressure of the wheel cylinder 12a of the rear wheel 11a at the same side as the front wheel 6a is controlled in accordance with the brake fluid pressure of the wheel cylinder 7a of the front wheel 6a. Thus, the rear wheel 11a running on the lower frictional coefficient side of the road is prevented from locking, similarly to the front wheel 6a at the same side. If the brake fluid pressure of the wheel cylinder 12a of the rear wheel 11a is controlled in common with the brake fluid pressure of the wheel cylinder 7b of the front wheel 6b running on the higher frictional coeficient side, the rear wheel 11a would be locked.

Next, there will be described the case that one of the two conduit systems fails.

For example, when brake fluid leaks from the one conduit system including the conduit 3, the fluid pressures of the wheel cylinders 7a and 12b do not increase by treading the brake pedal 2. On the other hand, the fluid pressure of the other conduit system including the conduit 16 increases by treading the brake pedal 2. Accordingly in the pressure selecting apparatus 8, the fluid pressure of the one master cylinder pressure chamber 55b rises, while that of the other master cylinder pressure chamber 55a remains zero. Thus, the fluid pressures to both sides of the one larger-diameter piston 41a are zero. Those to both sides of the other larger-diameter piston 41b are not zero, and substantially equal to each other. As the result, the piston group 38 is not moved, and remains located at the shown neutral position. Accordingly, both valve balls 61a and 61b remain separated from the valve seats 62a and 62b.

Thus, in the normal conduit system, the pressurized fluid is supplied from the master cylinder 1 into the wheel cylinder 7b of the left front wheel 6b through the conduits 16, 16b, the change-over valve 4b and the conduit 17. Further, it is supplied from the tandem master cylinder 1 into the wheel cylinder 12a of the right rear wheel 11a through the conduit 17a, the second input port 18, the output chamber 50b of the pressure selecting apparatus 8 the valve ball 61b being open ), the second output port 14 thereof, the conduit 15 and the proportioning valve 51b. Thus, the braking force can be securely obtained in the one conduit system.

When the change-over valve 4b is changed over into the position B or C with the tendency of the locking of the front or rear wheel 6b or 11a, the fluid pressure of the output chamber 50b becomes lower than that of the master cylinder pressure chamber 55b, in the pressure selecting apparatus 8, and so the piston group 38 is moved rightwards with the fluid pressure difference between both sides of the larger-diameter piston 41b. Accordingly, the valve ball 61b is moved further rightwards and 30 separated far from the valve seat 62b. The valve ball 61b remains separated.

When the change-over valve 4b is changed over into the position B, the wheel cylinders 7b and 12a of the wheels 6b and 11a are interrupted both from the tandem master cylinder 1 and from the hydraulic reservoir 25, so that the fluid pressure of the wheel cylinders 7b and 12a increases with the rightward movement of the piston group 38, since the volume of the output chamber 50b decreases therewith.

When the change-over valve 4b is changed over into the position C, the wheel cylinders 7b and 12a of the wheels 6b and 11a are interrupted from the master cylinder side, but communicate with the reservoir side. Thus, the braking forces of the front and rear wheels 6b and 11a are decreased, so that the wheels are prevented from locking.

As above described, the braking force can be securely obtained in the one right conduit system, even when the other conduit system fails.

There has been described the anti-skid control operation. Next, there will be described the drive slip control operation.

For example, it is assumed that the right front wheel 6a as the driven wheel slips very much on the start of the vehicle. That fact is detected by the control unit 31 and so it generates the drive slip signal Pa. In FIG. 1, the change-over valve 26a is changed over to the position E with the signal Pa. The fluid pressure pump 20a starts to be driven to suck the brake fluid from the hydraulic reservoir 25 of the tandem master cylinder. However, the discharging pressurized fluid of the tandem master cylinder 1, but the fluid is supplied to the wheel cylinder 7a of the front wheel 6a through the change-over valve 4a. Thus, the wheel 6a is braked. On the other hand, the contol unit 31 generates the brake holding signal EV or the brake relieving signal AV. The control signal Sa of the level "½" or "1" is accordingly generated from the control unit 31. Thus, the brake holding control and the brake relieving control are repeatedly effected and so the drive slip is stably controlled. The drive slip of the driven wheel is reduced to the optimum value. When the fluid pressure pumps 20a, 20b are driven by the single electro-motor, the change-over valve 4b is changed over to the position B for the left front wheel 6b which does not require the drive slip control. And so the left front wheel 6b is not braked. Further, the control unit 31 generates the drive signal Pb and also the change-over valve 26b is changed over to the position E. Accordingly, the left front wheel 6b and the right rear wheel 11a are not braked. At that control operation, the controlled fluid pressure of the wheel cylinder 7a of the front wheel 6a is applied to the output chamber 50a of the pressure selecting apparatus 8 and the larger-diameter piston 41a receives the pressure. However, the pressures of the master cylinder pressure chambers 55a, 55b and the other output chamber 50b are zero. Accordingly, the larger-diameter piston 41a moves rightwards and the right valve ball 61a is closed. Thus, a brake fluid pressure is not supplied to the wheel cylinder 12b of the left rear wheel 11b of the same conduit system.

When both of the front wheels 6a and 6b as driven wheels slip much in drive, the change-over valves 26a and 26b are changed over into the positions E and both of the change-over valves 4a and 4b are controlled. Accordingly, the drive slips of the front wheels 6a and 6b are controlled stably. Thus, the slips of the drive front wheels 6a and 6b approach the optimum value. At that time, the controlled fluid pressure of the wheel cylinders 7a and 7b of the front wheels 6a and 6b are supplied to the output chambers 50a, 50b of the pressure selecting apparatus 8. Accordingly, the larger-diameter pistons 41a and 41b are moved in the opposite directions and therefore to the master cylinder pressure chambers 55a and 55b, because the pressure of the tandem master cylinder 1 is zero. The valve balls 61a and 61b are closed. Accordingly, both of the rear wheels 11a and 11b as the non-driven wheels are not braked.

There has been described the drive slip control operation. Next, there will be described the case that the driver wants to apply the brake to the vehicle during the drive slip control, of the driver's free will.

In the drive slip control, as the change-over valves 26a, 26b are changed to the positions E, the tandem master cylinder 1 side is made to communicate with the sides of the conduits 34a, 34b. When the brake pedal 2 is trodden, the fluid pressure is transmitted from the tandem master cylinder 1 to the wheel cylinders 7a, 7b of the front wheels 6a, 6b through the conduits 3, 16, change-over valves 26a, 26b, conduits 34a, 34b and check valves 35a, 35b. It is further transmitted to the wheel cylinders 12a, 12b of the rear wheels 11a, 11b through the 8, conduits 13, 15. Accordingly, all of the wheels 6a, 6b, 11a and 11b can be rapidly braked though they are under the drive slip control.

While the preferred embodiment has been described, variations thereto will occur to those skilled in the art within the scope of the present inventive concepts which are delineated by the following claims.

Figure 3:
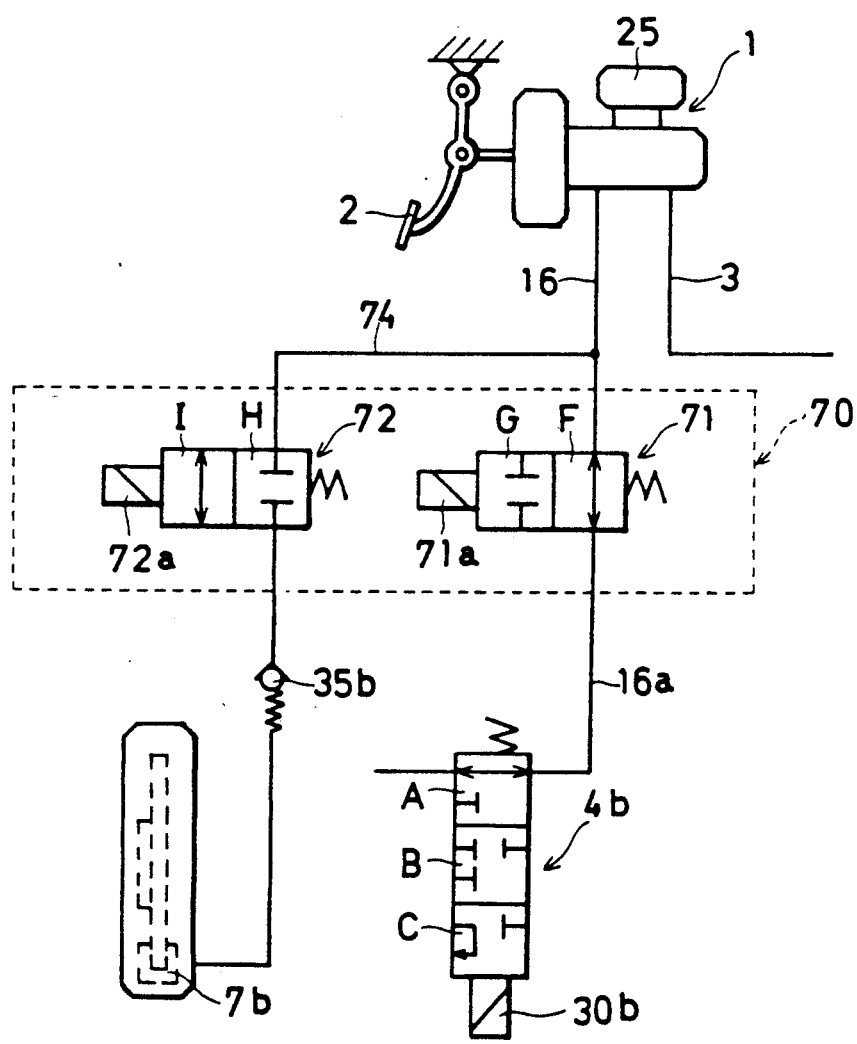
FIG. 3 is a schematic view of an important part of a brake fluid pressure control apparatus according to one modification of the embodiment.

For example, in the above described embodiment, the change-over valves 26a, 26b according to this invention are constructed as single bodies respectively. A valve apparatus 70 consisting of two cut-off valves as shown in FIG. 3 may be used instead of the change-over valves 26a, 26b, respectively. The parts in FIG. 3 which correspond to those in FIG. 1 are denoted by the same reference numerals. Both of the brake conduit systems are made in the same constructions. Accordingly, only the conduit system including the conduit 16 will be described, while the conduit system including the conduit 3 is omitted to describe.

The valve apparatus 70 consists of cut-off valves 71 and 72. During the anti-skid control or the ordinary braking control, the one cut-off valve 71 normally takes the position F in which the tandem master cylinder 1 side is made to communicate with the change-over valve 4b side. The other cut-off valve 72 normally takes the position H in which the communication between a conduit 74 connected to the tandem master cylinder 1 side and the wheel cylinder 7b side is interrupted.

During the drive slip control, the drive signal is supplied to solenoid portions 71a and 72b of the cut-off valves 71 and 72. The cut-off valves 71 and 72 are changed over to the positions G and I with the drive signal. Accordingly, in the cut-off valve 71, the communication between the tandem master cylinder 1 side and the change-over valve 4b side is interrupted, while in the cut-off valve 72, the tandem master cylinder 1 and the wheel cylinder 7b communicate with each other. The check valve 35b is arranged between the cut-off valve 72 and the wheel cylinder 7b in the same manner as the above described embodiment. The check valve 35b permits the fluid to flow from the cut-off valve side to the wheel cylinder side. Such an arrangement has the same effects as the embodiment.

Figure 4:
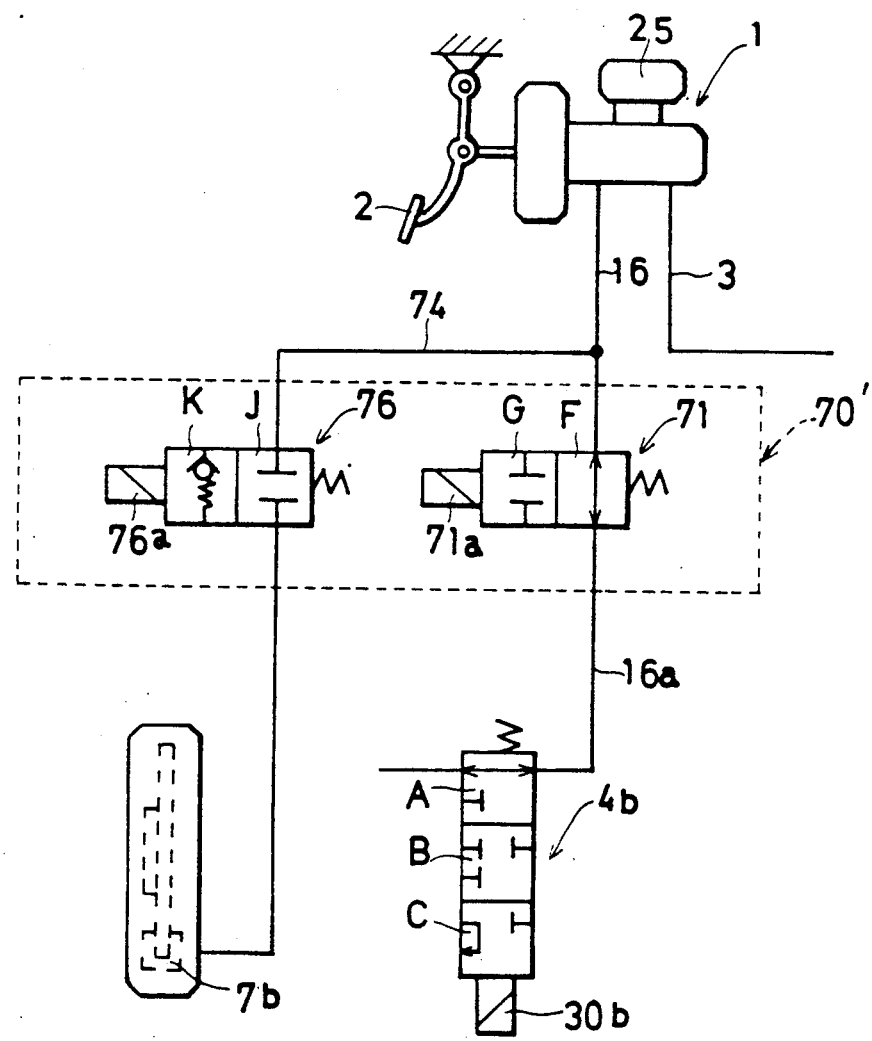
FIG. 4 is a schmatic view of an important part of a brake fluid pressure control apparatus according to another modification of the embodiment.

FIG. 4 shows another modification of the change-over valves 26a and 26b. Parts in FIG. 4 which correspond to those in FIG. 3, are denoted by the same reference numerals, the description of which will be omitted. A valve apparatus 70' consists of the above described cut-off valve 71 and a controllable check valve device 76. The device 76 takes normally a position J in which both sides are cut off from each other. When its solenoid portion 76a is energized, the device 76 is changed over to a position K in which it functions as a check valve which permits fluid to flow only from the tandem master cylinder side to the wheel cylinder side.

Further, in the above embodiment, the three-port three-position electro-magnetic change-over valve 4a and 4b constructed in one body is used as a fluid pressure control valve. Instead of the valve 4a and 4b, valve apparatus consisting of two change-over valves may be used, respectively.

Further, in the above embodiment, the hydraulic reservoir 25 of the tandem master cylinder 1 is directly connected with the suction sides of the fluid pressure pumps 20a and 20b through the conduits 27a and 27b. Instead, auxiliary pumps may be arranged in the conduits 27a and 27b so that the check valves provided in the fluid pressure pumps 20a, 20b may be rapidly opened in response to the drive slip control.

In the above embodiment, the so-called two-channel system in which the two fluid pressure control valves 4a, 4b are used, has been described. Instead, a four-channel (full-channel) control system in which fluid pressure control valves are provided for the respective wheels, may be used. Or a one-channel or a three-channel control system may be used.

Further, in the above embodiment, the pressure selecting apparatus is used, but it can be omitted.

Further, in the above embodiment, the check valves 65a and 65b as the relief valves are arranged between the discharging ports of the fluid pressure pumps 20a, 20b and the conduits 27a, 27b. For the fail safe of the check valves 65a and 65b, other check valves may be connected at the conduits 3a and 16a. These check valves permit fluid to flow towards the tandem master cylinder 1 side from the fluid pressure pump side.

This invention is applicable to all conduit-types including X-conduit type and front-rear separation type.

Further, in the above embodiment, there has been described the front drive wheel vehicle. Instead, this invention is applicable to the rear drive vehicle. In that case, the change-over valves 4a and 4b are arranged between the tandem master cylinder and the wheel cylinders of the rear wheels and the connecting relationship to the pressure selecting apparatus 8 is inverted between the front wheels and rear wheels.

Further, this invention is applicable to the four wheel-drive (4WD) vehicle or the two-wheel motorcycle.

Further, in the above embodiment, the drive signal is supplied to the solenoid portions 64a and 64b of the change-over valves 26a and 26b during the drive slip control. When the driver treads the brake pedal 2 in order to apply the brake to the vehicle during the drive slip control, the pressurized fluid is supplied to the wheel cylinders through the check valves 35a and 35b. Further, when the brake pedal 2 is trodden, the drive signals to the change-over valves 26a, 26b may be changed to "0" by, for example, a brake light switch signal, after a predetermined time or immediately, and the change-over valves 4a, 4b may be immediately changed to the positions A even when they are in the position B or C, so that the pressurized fluid may be transmitted from the tandem master cylinder 1 to the wheel cylinders through the positions D of the change-over valves 26a, 26b and the positions A of the change-over valves 4a, 4b. Accordingly, the anti-skid control is effected when the sudden brake is applied to the vehicle and the safe driving can be secured.

What is claimed is:

1. A brake fluid pressure control apparatus for a vehicle comprising:
   (A) master cylinder means;
   (B) wheel cylinder means;
   (C) a control unit for measuring braking slip and driving slip of wheels;
   (D) first brake fluid conduit means for connecting said master cylinder means with said wheel cylinder means;
   (E) fluid pressure control valve means being arranged in said first brake fluid conduit means and receiving instructions from said control unit for controlling brake fluid pressures to said wheel cylinder means;
   (F) hydraulic reservoir means for reserving the brake fluid discharged through said fluid pressure control valve means from said wheel cylinder means;
   (G) fluid pressure pump means for pressurizing the brake fluid in said hydraulic reservoir means and supplying it to main conduit means connecting said master cylinder means with said fluid pressure control valve means;
   (H) second brake fluid conduit means for connecting said master cylinder means with said wheel cylinder means;
   (I) a valve apparatus being arranged in said main conduit means, said valve apparatus having a first position for connecting said master cylinder means with said fluid pressure control valve means and cutting off said master cylinder means from said second brake fluid conduit means, a second position for connecting said master cylinder means with said second brake fluid conduit means and cutting off said master cylinder means from said fluid pressure control valve means, and wherein said valve apparatus takes said first position normally and during the braking slip control operation; and
   (J) check valve means being arranged in said second brake fluid conduit means, said check valve means permitting brake fluid to flow from said master cylinder means side towards said wheel cylinder means side.

2. A fluid pressure brake control apparatus according to claim 1, in which said valve apparatus comprises two cut-off valves, the one of which is normally open, and closed in the drive slip control operation, and the other of which is normally close and opened in the drive slip control operation.

3. A fluid pressure brake control apparatus according to claim 1, in which said valve apparatus comprises a cut-off valve and a check valve device, said cut-off valve being normally open and closed in the drive slip control operation, and said check valve device being normally in the cut-off state, and functioning as said check valve means in the driving slip control operation.

4. A fluid pressure brake control apparatus according to claim 1, in which said wheel cylinder means comprises front wheel cylinders and rear wheel cylinders, wherein said fluid pressure control valve means includes a first fluid pressure control valve for one of said front wheel cylinders and a second fluid pressure control valve for the other of said front wheel cylinders, wherein a pressure selecting apparatus for generating a fluid pressure in accordance with the lower one of the brake fluid pressures of said front wheel cylinders controlled with said first and second fluid pressure control valves is arranged between said front wheel cylinders and said rear wheel cylinders, wherein said first fluid pressure control valve is arranged between said master cylinder means and said one of the front wheel cylinders, and wherein said second fluid pressure control valve is arranged between said master cylinder means and said other of the front wheel cylinders.

5. A fluid pressure brake control apparatus according to claim 1, in which said wheel cylinder means comprises front wheel cylinders and rear wheel cylinders, wherein said fluid pressure control valve means includes a first fluid pressure control valve for one of said rear wheel cylinders, and a second fluid pressure control valve for the other of said rear wheel cylinders, wherein a pressure selecting apparatus for generating a fluid pressure in accordance with the lower one of the brake fluid pressures of said rear wheel cylinders controlled with said first and second fluid pressure control valves is arranged between said front wheel cylinders and said rear wheel cylinders, wherein said first fluid pressure control valve is arranged between said master cylinder means and said one of the rear wheel cylinders, and wherein said second fluid pressure control valve is arranged between said master cylinder means and said other of the rear wheel cylinders.

* * * * *